US012467781B2

(12) United States Patent
Wichern et al.

(10) Patent No.: US 12,467,781 B2
(45) Date of Patent: Nov. 11, 2025

(54) SYSTEM AND METHOD FOR UNSUPERVISED ANOMALOUS SOUND DETECTION

(71) Applicant: Mitsubishi Electric Research Laboratories, Inc., Cambridge, MA (US)

(72) Inventors: Gordon Wichern, Cambridge, MA (US); Satvik Venkatesh, Cambridge, MA (US); Aswin Shanmugam Subramanian, Cambridge, MA (US); Jonathan Le Roux, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 327 days.

(21) Appl. No.: 18/188,606

(22) Filed: Mar. 23, 2023

(65) Prior Publication Data
US 2024/0003737 A1    Jan. 4, 2024

Related U.S. Application Data

(60) Provisional application No. 63/367,262, filed on Jun. 29, 2022.

(51) Int. Cl.
*G01H 3/08* (2006.01)
*G01H 1/00* (2006.01)
(Continued)

(52) U.S. Cl.
CPC .............. *G01H 3/08* (2013.01); *G01H 1/003* (2013.01); *G06N 3/0464* (2023.01); *G10L 25/30* (2013.01); *G10L 25/51* (2013.01)

(58) Field of Classification Search
CPC ....... G10L 25/51; G10L 25/30; G06N 3/0464; G01H 2/003; G01H 3/08; G01H 1/003
See application file for complete search history.

(56) References Cited

U.S. PATENT DOCUMENTS

2022/0108698 A1*  4/2022  Moritz ................ G05B 23/024
2022/0239758 A1*  7/2022  Klein .................... G06N 20/00
(Continued)

OTHER PUBLICATIONS

K. Morita, T. Yano, and K. Tran, "Anomalous sound detection using cnn-based features by self supervised learning," DCASE2021 Challenge, Tech. Rep., Jul. 2021.
(Continued)

*Primary Examiner* — Helen C Kwok
(74) *Attorney, Agent, or Firm* — Gene Vinokur

(57) ABSTRACT

A system and a method for detecting anomalous sound are disclosed. The method includes receiving an audio signal from a sound source in a recording environment. The sound source and the recording environment are characterized by a set of attributes including a first attribute pertaining to a first attribute type and a second attribute pertaining to a second attribute type. A multi-head neural network is trained to extract from the received audio signal a first embedding vector indicative of the first attribute type and a second embedding vector indicative of the second attribute type. The first embedding vector is compared with a first set of embedding vectors to classify attributes of the first attribute type and the second embedding vector is compared with a second set of embedding vectors to classify attributes of the second attribute type, to determine a result of anomaly detection.

20 Claims, 11 Drawing Sheets

(51) Int. Cl.
  *G06N 3/0464* (2023.01)
  *G10L 25/30* (2013.01)
  *G10L 25/51* (2013.01)

(56) References Cited

U.S. PATENT DOCUMENTS

| | | | | |
|---|---|---|---|---|
| 2022/0382736 A1* | 12/2022 | Beilis | ............... | G06N 3/045 |
| 2023/0020834 A1* | 1/2023 | Chatterjee | ............ | G06N 3/08 |
| 2023/0086355 A1* | 3/2023 | Wichern | ............ | G06N 3/08 |
| | | | | 704/200 |
| 2025/0077840 A1* | 3/2025 | Germain | ......... | G06F 18/2433 |

OTHER PUBLICATIONS

K. Wilkinghoff, "Utilizing sub-cluster adacos for anomalous sound detection under domain shifted conditions," DCASE2021 Challenge, Tech. Rep., Jul. 2021.

J. Lee, N. J. Bryan, J. Salamon, Z. Jin, and J. Nam, "Metric learning vs classification for disentangled music representation learning," in Proc. ISMIR, 2020.

Venkatesh et al. Disentangled surrogate task learning for improved domain generalization in unsupervised anolamous sound detection, Detection and classification of acoustic scenes and events 2022, Jul. 2, 2022.

* cited by examiner

SYSTEM AND METHOD FOR UNSUPERVISED ANOMALOUS SOUND DETECTION

TECHNICAL FIELD

This disclosure generally relates to sound processing, and more specifically to detecting anomalies and providing explanation of the detected anomalies in an audio signal.

BACKGROUND

Diagnosis and monitoring of machine operating performance is important for a wide variety of applications. The diagnosis and the monitoring operations may often be performed manually by a skilled technician. For instance, the skilled technician may listen and analyze sounds produced by the machine to determine an anomalous sound. The manual process to analyze the sounds may be automated to process sound signals produced by the machine and to detect anomalous sound in the sound signals.

In some scenarios, automated sound diagnosis may be performed to detect the anomalous sound based on deep learning-based techniques. Typically, the automated sound diagnosis may be used to detect anomalous sound using training data that corresponds to normal operating conditions of the sound diagnosis. The anomalous sound detection based on such training data is an unsupervised approach. The unsupervised anomalous sound detection may be suitable for detecting specific types of anomalies, such as abrupt transient disturbances or impulsive sounds that may be detected based on abrupt temporal changes.

Unsupervised anomalous sound detection is the problem of learning a model that can detect anomalies when only data in normal operating conditions is available for training the model parameters. A typical application is condition monitoring and diagnosis of machine sounds in applications such as predictive maintenance and factory automation. Typical approaches for unsupervised anomalous sound detection include those based on autoencoder-like architectures, where a model trained only on normal data to reconstruct its input should exhibit large reconstruction error when presented with an anomalous example at inference time. Another class of approaches, referred to as surrogate task models, use an alternative supervised training task to learn a model of normality, and then measure deviations from normal to predict anomalies. Example surrogate tasks include: (1) outlier exposure, where sounds that are known to be quite different from the machine of interest are used as synthetic anomalies, (2) predicting metadata (e.g., machine instance) or attributes (e.g., operating load), or (3) learning to predict what augmentations (e.g., time-stretching or pitch-shifting) are applied to an audio clip.

One major drawback of existing anomalous sound detection systems is that they fail when presented with domain shift, i.e., acoustic characteristics that change between the normal data collected for training and normal data collected at inference time due to factors such as different background noise, different operating voltages, etc. This failure is typically caused by algorithms that are unable to distinguish between unexpected signal changes caused by an anomalous sound and expected signal changes caused by domain shift.

Accordingly, there is a need to overcome the above-mentioned problems associated with anomalous sound detection in domain shift conditions. More specifically, there is a need to develop a method and a system for detecting anomalous sounds in an audio signal in an efficient and feasible manner.

SUMMARY

Various embodiments of the present disclosure disclose a system and a method for detecting an anomalous sound in an audio signal. It is the object of some embodiments to perform anomalous sound detection using deep learning techniques.

It is an object of some embodiments to provide unsupervised anomalous sound detection by learning a model that can detect anomalies when only data in normal operating conditions is available for training the model parameters. A typical application is condition monitoring and diagnosis of machine sounds in applications such as predictive maintenance and factory automation.

One major drawback of existing anomalous sound detection algorithms is that they fail when presented with domain shift, i.e., acoustic characteristics that change between the normal data collected for training and normal data collected at inference time due to factors such as different background noise, different operating voltages, etc. This failure is typically caused by algorithms that are unable to distinguish between unexpected signal changes caused by an anomalous sound and expected signal changes caused by domain shift.

Typical approaches for unsupervised anomalous sound detection include those based on autoencoder-like architectures, where a model trained only on normal data to reconstruct its input should exhibit a large reconstruction error when presented with an anomalous example at inference time. Another class of approaches, referred to herein as surrogate task models, uses an alternative supervised training task to learn a model of normality, and then measure deviations from normal to predict anomalies. Example surrogate tasks include: (1) outlier exposure, where sounds that are known to be quite different from the machine of interest are used as synthetic anomalies, (2) predicting metadata (e.g., machine instance) or attributes (e.g., operating load), or (3) learning to predict what augmentations (e.g., time-stretching or pitch-shifting) are applied to an audio clip.

Some embodiments are based on the recognition that the unsupervised anomalous sound detection using the surrogate task models can be adapted for specific operation scenarios by choosing a specific surrogate task and thus can be made more robust in specific applications than the approach based on the autoencoder-like architectures. However, the selection of a specific surrogate task for a specific application may be impractical in some scenarios. Besides, even when a surrogate task model is developed for a specific advantageous task, this model still suffers from the domain shift problem.

To that end, it is an object of some embodiments to provide a system and a method for unsupervised anomalous sound detection robust to the domain shift problem. Additionally or alternatively, it is an object of some embodiment to provide surrogate task models approach to learn a model of normality resilient to the domain shift problem. Additionally or alternatively, it is an object of some embodiments to provide an anomalous sound detection system configured to perform the anomaly detection and applications benefiting from such a detection.

Some embodiments are based on understanding that the surrogate task model approach can be extended to consider not one surrogate task, but multiple surrogate tasks. In other words, this approach can be extended to learn a model of normality for multiple surrogate tasks. In theory, this approach can be more domain-shift resilient, since two tasks are better than one. However, some embodiments are based on recognition supported by experiments that just extending the surrogate task model approach to consider multiple surrogate tasks does not necessarily make the learned model of normality more resistant to the domain shift problem.

Some embodiments are based on the realization that to increase the resistance of the model of normality to the domain shift there is a need to satisfy two conditions: (1) the embedding vectors generated to classify the multiple surrogate tasks need to be produced together, i.e., have a dependence on each other, but (2) these embedding vectors need to be analyzed separately to detect the anomaly. The interdependent generating requirement allows the learning of rich embedding vectors, as certain surrogate tasks are not informative enough to learn a powerful model by themselves. The separate testing disentangles the surrogate tasks to get the resilience to the domain shift.

Some embodiments are based on the realization that these two conditions can be satisfied when the embedding vector for different surrogate tasks is generated by a multi-head neural network having one input and multiple outputs, while the outputs of the multi-head neural network are analyzed separately. For example, one embodiment processes the audio signal with a multi-head neural network trained to extract from the received audio signal a first embedding vector indicative of the first attribute type and a second embedding vector indicative of the second attribute type. Because the first and the second types of attributes are different from each other, they can be adapted by different embodiments for classifying different surrogate tasks and thus can satisfy the first condition. Examples of the multi-head neural network include a convolutional neural network module connected to multiple thin output layers including a first output layer for outputting the attributes of the first attribute type and a second output layer for outputting the attributes of the second attribute type.

Next, some embodiments compare the first embedding vector with a first set of normal embedding vectors to produce a first anomaly score and compare the second embedding vector with a second set of normal embedding vectors to produce a second anomaly score. The result of anomaly detection is determined based on one or a combination of the first anomaly score and the second anomaly score thereby satisfying the second condition of independent evaluation.

Accordingly, one embodiment discloses an anomalous sound detection system comprising at least one processor; and a memory having instructions stored thereon that, when executed by the at least one processor, cause the anomalous sound detection system to receive an audio signal generated by a sound source in a recording environment, wherein the sound source and the recording environment are characterized by a set of attributes including a first attribute pertaining to a first attribute type and a second attribute pertaining to a second attribute type. The received audio signal is processed with a multi-head neural network trained to extract from the received audio signal a first embedding vector indicative of the first attribute type and a second embedding vector indicative of the second attribute type. The first embedding vector is compared with a first set of normal embedding vectors previously produced by the multi-head neural network to classify attributes of the first attribute type and, the second embedding vector is compared with a second set of normal embedding vectors previously produced by the multi-head neural network to classify attributes of the second attribute type to determine a result of anomaly detection. The anomalous sound detection system is then configured to render the result of the anomaly detection.

Another embodiment discloses a computer-implemented method for performing detection of an anomalous sound, the method comprising: receiving an audio signal generated by a sound source in a recording environment, wherein the sound source and the recording environment are characterized by a set of attributes including a first attribute pertaining to a first attribute type and a second attribute pertaining to a second attribute type. The computer-implemented method further comprises processing the received audio signal with a multi-head neural network trained to extract from the received audio signal a first embedding vector indicative of the first attribute type and a second embedding vector indicative of the second attribute type. The computer-implemented further comprises comparing the first embedding vector with a first set of normal embedding vectors previously produced by the multi-head neural network to classify attributes of the first attribute type and comparing the second embedding vector with a second set of normal embedding vectors previously produced by the multi-head neural network to classify attributes of the second attribute type to determine a result of anomaly detection; and rendering the result of anomaly detection.

Further features and advantages will become more readily apparent from the following detailed description when taken in conjunction with the accompanying drawings.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of the ordinary skills in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

System Overview

Figure 1A:
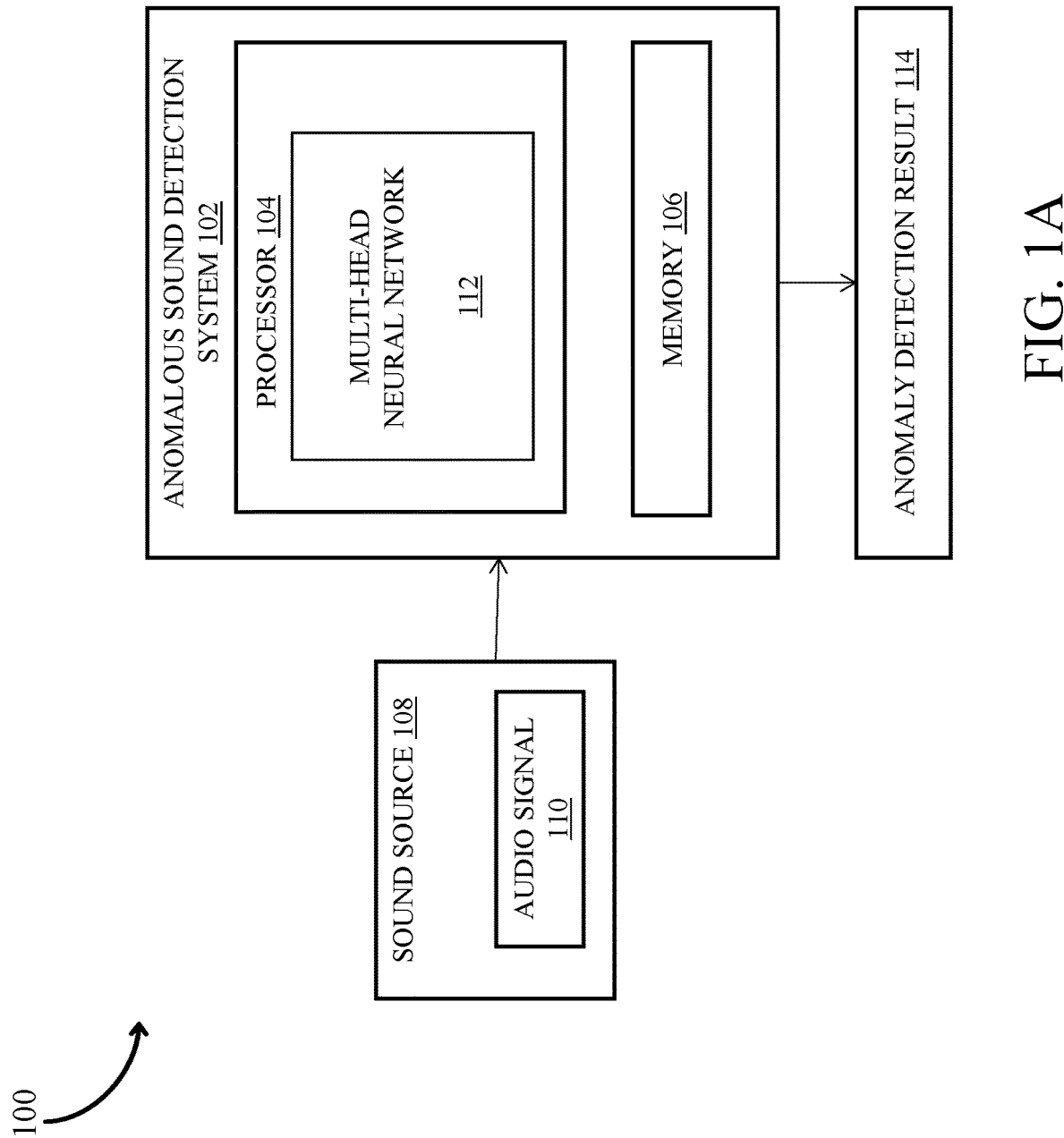
FIG. 1A illustrates a recording environment for detection of anomalous sound, in accordance with an embodiment of the present disclosure.

FIG. 1A illustrates a recording environment 100 for detection of anomalous sound, in accordance with an embodiment of the present disclosure. The recording environment 100 includes an anomalous sound detection system 102, coupled to a sound source 108 generating an audio signal 110. The anomalous sound detection system 102 includes a processor 104 and a memory 106. The memory 106 is configured to store instructions for generating an anomaly detection result 114 for detecting the anomalous sound. The anomalous sound includes an anomalous sound signal which is not normally expected to occur during an operation. For example, in a manufacturing process, the operation sounds related to machines may have some normal sounds and some abnormal or anomalous sounds. Such as, a clinging sound encountered during operation of a machine may indicate some fault or wear and tear of machine parts, and thus may be considered an anomalous sound. It is an object of some embodiments to detect such an anomalous sound using the anomalous sound detection system 102. Further, the detection of the anomalous sound is used to predict the fault associated with the machine. For example, the exact sound source 108 of the anomaly detection or the anomalous sound, is the faulty part of the machine. The operation of the anomalous sound detection system 102 may be embodied in the form of instructions, which are stored in the memory 106, and are executed by the processor 104.

In some embodiments, the memory 106 is configured to store instructions for implementing a multi-head neural network 112 to facilitate in detection of the anomalous sound. The memory 106 corresponds to at least one of RAM, ROM, EEPROM, flash memory or other memory technology, CD-ROM, digital versatile disks (DVD) or other optical disk storage, magnetic cassettes, magnetic tape, magnetic disk storage, or any other storage medium which can be used to store the desired information, and which can be accessed by the anomalous sound detection system 102. The memory 106 includes non-transitory computer-storage media in the form of volatile and/or nonvolatile memory. The memory 106 may be removable, non-removable, or a combination thereof. Exemplary memory devices include solid-state memory, hard drives, optical-disc drives, and the like.

The anomalous sound detection system 102 is configured to receive the audio signal 110 generated by the sound source 108 in the recording environment 100. The recording environment 110 may correspond to an application specific environment, such as a manufacturing plant, a vehicle, a studio, and the like. The audio signal 110 may correspond to non-stationary sounds, such as sound of an operating machine, sound of a working engine, or the like. The audio signal 110 may be converted to a representation in the time frequency domain, such as a spectrogram. Generally, the spectrogram includes elements that are defined by values, such as pixels in the time-frequency domain. Each value of each of the elements is identified by a coordinate in the time-frequency domain. For instance, time frames in the time-frequency domain are represented as columns and frequency bands in the time-frequency domain are represented as rows.

The audio signal 110 is associated with sound produced from the sound source 108. In case of manufacturing set-up, the sound source 108 corresponds to at least one of a machine, an electric equipment, or an engine. For example, the sound source 108 may include a drilling machine, a grinding machine, a packaging machine, and the like.

Figure 1B:
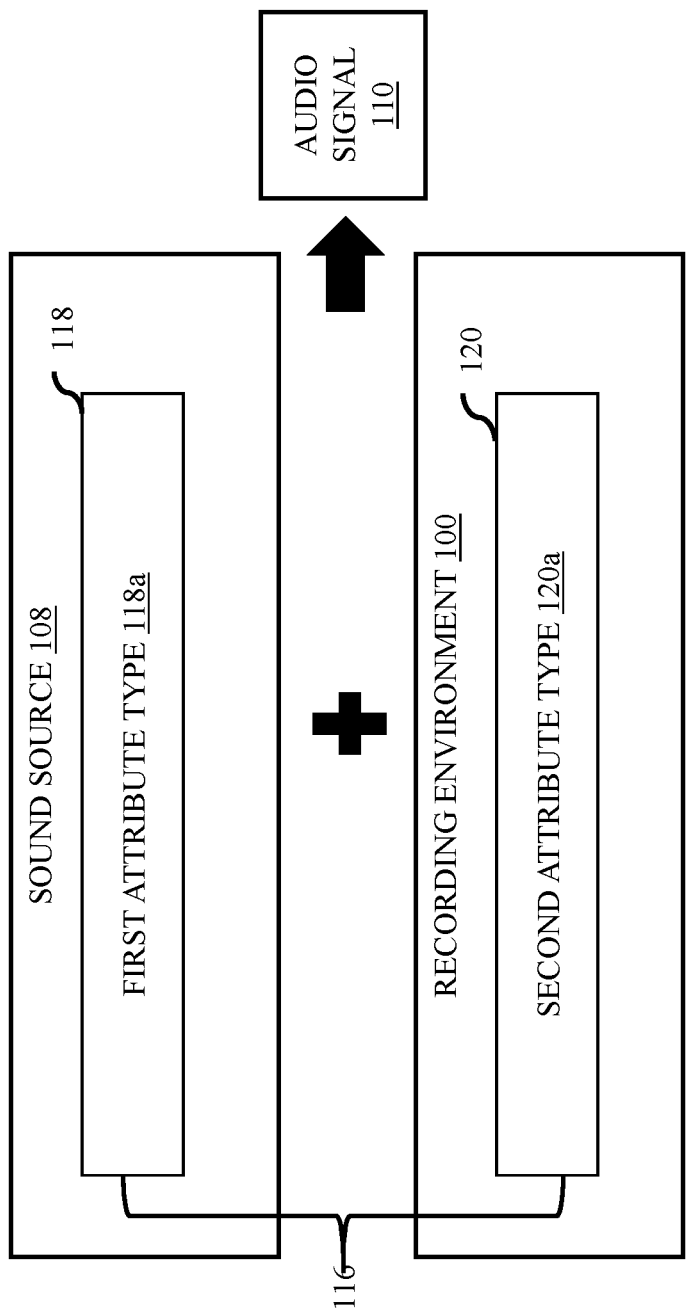
FIG. 1B illustrates a schematic diagram showing a set of attributes of the sound source and the recording environment, in accordance with an embodiment of the present disclosure.

The sound source 108 and the recording environment 100 are characterized by a set of attributes. FIG. 1B illustrates a schematic diagram showing a set of attributes 116 of the sound source 108 and the recording environment 100.

The set of attributes 116 includes, for the sound source 108, at least a first attribute 118 pertaining to a first attribute type 118a. The set of attributes 116 also includes, for the recording environment 100, at least a second attribute 120 pertaining to a second attribute type 120a.

To that end, in one embodiment the first attribute and the second attribute types are selected such that a classification of the attributes of the first attribute type 118a is independent of one or a combination of the recording environment 100, or the type of the sound source 108, or the state of operation of the sound source 108. On the other hand, a classification of the attributes of the second attribute type 120a is dependent on one or a combination of the recording environment 100, or the type of the sound source 108, or the state of operation of the sound source 108. That is to say the first attribute type 118a comprises attributes such that a classification of the attributes of the first attribute type 118a is independent of one or a combination of: the recording environment 100, the type of the sound source 108, and the state of operation of the sound source 108, and the second attribute type 120a comprises other attributes such that a classification of the other attributes of the second attribute type 120a is dependent on one or a combination of the recording environment 100, the type of the sound source 108, and the state of operation of the sound source 108.

For example, the first attribute 118 of the first attribute type 118a is associated with the sound source 108, e.g., classifying a motor from the sound signal. Indeed, the motor and/or the type of the motor stays the same regardless of the environment where the sound of the operation of the motor is recorded. So, the first attribute 118 is the sound of the motor and the first attribute type 118a could be normal sound or abnormal sound.

Further, in the example above, the second attribute 120 of the second attribute type 120a can be indicative of a state of the operation of the motor. To that end, the motor comprises different characteristics related to the state of the operation of the motor. The characteristics include a characteristic of an input provided to the motor, for example operating voltage required for the motor. The characteristics also include a characteristic of an output of the motor, for example, torque generated by the motor. For example, the second attribute 120 could be state of the motor, si, when the motor is working at low speed, and the second attribute type can be a voltage value for powering the motor in the state at this state si. In another example, the second attribute type 120a is torque produced by the motor that can vary during the operation of the motor from the state si to other states.

The audio signal 110 is thus a combination of the set of attributes 116 including the first attribute 118 of the first attribute type 118a, and the second attribute 120 of the second attribute type 120a. The anomalous sound detection system 102 is configured to process the audio signal 110, characterized by the set of attributes 116 including the first attribute 118 of first attribute type 118a and the second attribute 120 of the second attribute type 120a, with the multi-head neural network 112.

Figure 2:
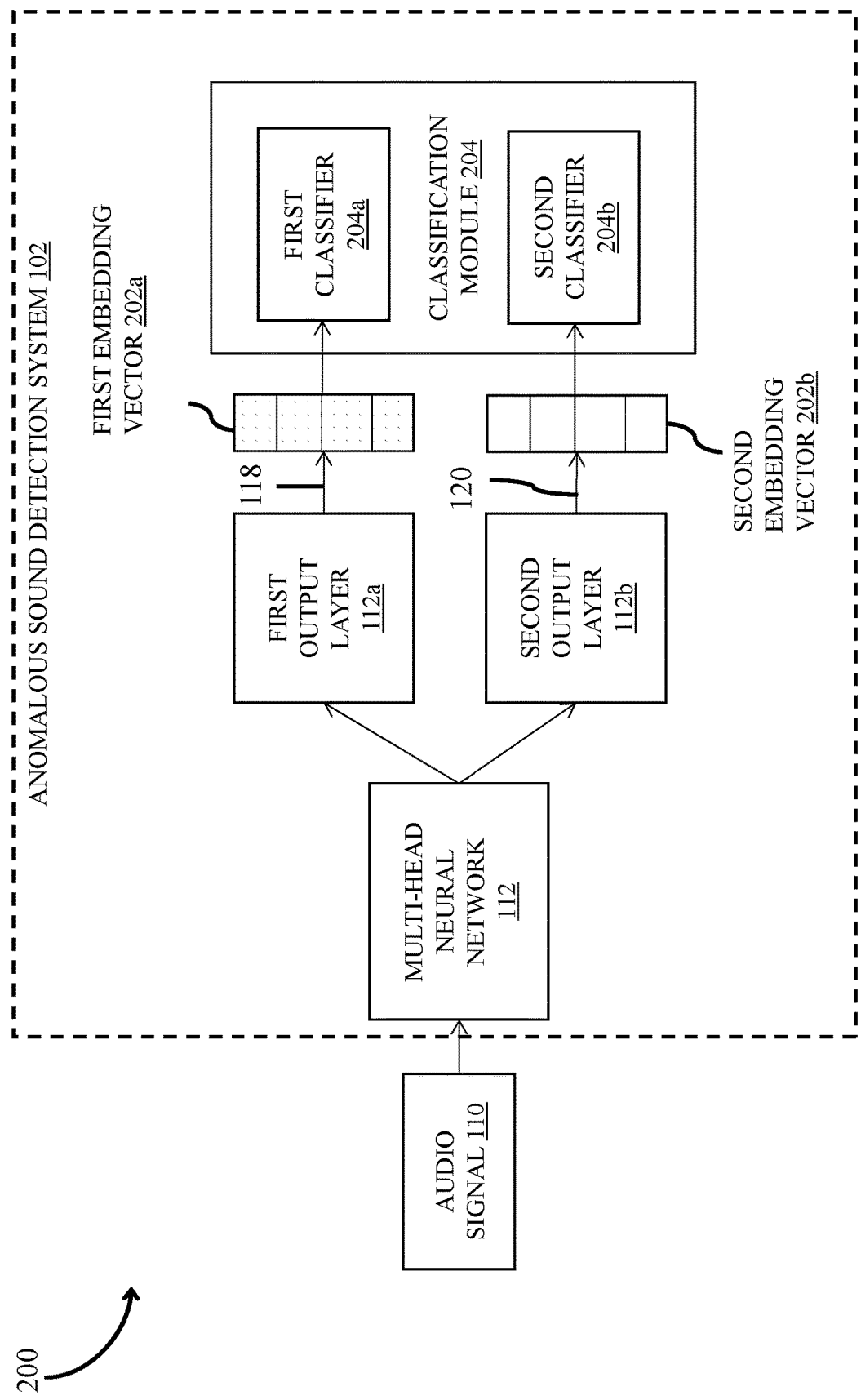
FIG. 2 illustrates a block diagram showing an operation of a multi-head neural network, in accordance with an embodiment of the present disclosure.

FIG. 2 illustrates a block diagram 200 showing operation of the multi-head neural network 112, in accordance with an embodiment of the present disclosure. The multi-head neural network 112 is configured to process the audio signal 110 (which may be a test audio signal or a received audio signal of inference time) with one or more linear layers which are thin output layers: a first output layer 112a and a second output layer 112b. To that end, in some implementations, the multi-head neural network 112 includes a convolutional neural network module that is connected to multiple thin output layers, such as the first output layer 112a and the second output layer 112b. It may be understood that the number of thin output layers is shown to be two in the FIG. 2 only for purpose of illustration. In effect, any equivalent number of output layers may be used as thin output layers, without deviating from the scope of the present disclosure.

The multi-head neural network 112 is configured to process the audio signal 110 to extract a first embedding vector 202a indicative of the first attribute type 118a and a second embedding vector 202b indicative of the second attribute type 120a. To that end, the first output layer 112a outputs the extracted first embedding vector 202a and the second output layer 202b outputs the extracted second embedding vector 202b. In an example, the multi-head neural network 112 provides a global depthwise convolution (GDC) output of dimension 512-D, which is then connected to each of the linear output layers: the first output layer 112a and the second output layer 112b. Both the first output layer 112a and the second output layer 112b are 1×1 convolutions in an example.

The first embedding vector 202a and the second embedding vector 202b are then provided to a classification module 204 which includes a first classifier 204a for classifying attributes of the first attribute type 118a and a second classifier for classifying attributes of the second attribute type 120a, which are embedded in the first embedding vector 202a and the second embedding vector 202b, respectively. As is already understood, the classification of the attributes of the first attribute type 118a is independent of the recording environment 100, while a classification of the attributes of the second attribute type 120a is dependent on the recording environment 100. In an example, each of the first classifier 204a and the second classifier 204b use Softmax activation function.

Some embodiments are based on the realization that when surrogate tasks are disentangled from each other in the anomalous sound detection system 102, the types of tasks can be selected to further improve the resilience to the domain shift problem. For example, some tasks can be domain dependent, while others can be domain agnostic. To that end, classification of the attributes of the first attribute type 118a as independent of the recording environment, while a classification of the attributes of the second attribute type 120a as dependent on the recording environment makes the first surrogate task based on classifying the first attribute type 118a to be domain agnostic, while the second surrogate task based on classifying the second attribute type 120a is domain dependent.

Examples of surrogate tasks for the attributes of the first attribute type 118a include determining a motor from the sound signal. Indeed, the motor and/or the type of the motor stays the same regardless of the environment where the sound of the operation of the motor is recorded. In other words, a classifier trained to classify the embedding vector indicative of the attribute of the first type should produce the same result for classifying outputs of multiple executions of the multi-head neural network 112.

Conversely, in the example with the motor, the attributes of the second type can be indicative of a state of the operation of the motor and may vary between different execution of the multi-head neural network 112. For example, the attributes of the second type can be indicative of the voltage powering the motor or the torque produced by the motor that can vary during the operation of the motor.

In an embodiment, the anomalous sound detection system 102 includes a machine learning module (not shown), that encompasses the multi-head neural network 112 and is configured to operate differently at a training time and an execution time. In addition, the anomalous sound detection system 102 also includes an output interface (not shown in the figure) to output the result of anomaly detection.

Figure 3A:
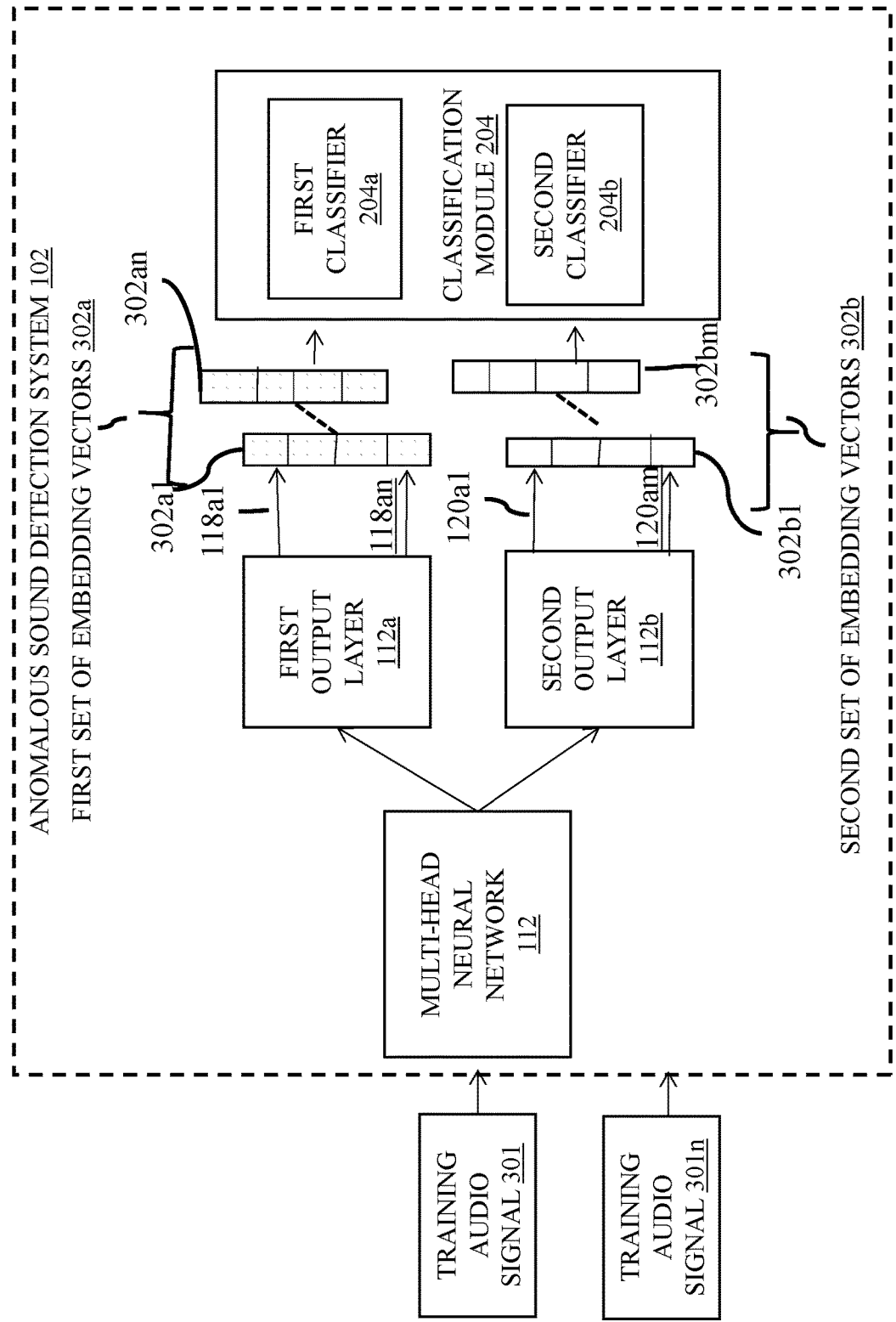
FIG. 3A illustrates a schematic diagram showing a training phase operation of the anomalous sound detection system, according to an embodiment of the present disclosure.

FIG. 3A illustrates a schematic diagram showing a training phase operation of the anomalous sound detection system 102, according to an embodiment of the present disclosure. As shown in FIG. 3A, the training phase includes receiving a training audio signal 301 which comprises the first set of attributes 118 of the first attribute type 118a and the second set of attributes 120 of the second attribute type 120a. The first attribute type 118a comprises attributes such that a classification of the attributes of the first attribute type 118a is independent of one or a combination of: the recording environment 100, a type of the sound source generating the training audio signal 301, and a state of operation of the sound source generating the training audio signal 301. The second attribute type 120a comprises other attributes such that a classification of the other attributes of the second attribute type 120a is dependent on one or a combination of the recording environment 100, the type of the sound source generating the training audio signal 301, and the state of operation of the sound source generating the training audio signal 301.

The multi-head neural network 112 is trained with training data including training audio signals pertaining to different values of the attributes of the first attribute type 118a and different values of the attributes of the second attribute type 120a. Doing this in such a manner increases the accuracy of the normality model of the anomalous sound detection system 102.

For example, for different training audio signal 301 samples, there may be different values of the first attribute type 118a such as a first value 118a1, an nth value 118an, where n is any arbitrary number, and the like. Also, different training audio signal 301 samples may also have similar values of the first attribute type 118a.

Similarly, for different training audio signal 301 samples, there may be different values of the second attribute type 120a such as a primary value 120a1, an mth value 120am, where m is any arbitrary number, and the like. Also, different training audio signal 301 samples may also have similar values of the second attribute type 120a.

The different values of the first attribute type 118a and the second attribute type 120a at the training time form the ground truth values associated with different tasks. The multi-head neural network is trained jointly with the classification module to produce different encoding advantageous for classification to match the ground truth values associated with different tasks. Notably, in some implementations, the classification module is used only in the training stage to train the multi-head neural network, but not in the testing stage.

Thus, each training audio signal 301 is associated with a corresponding ground-truth value of the attribute of the first attribute type, for example, the first value 118a1, which is one of the different values of the first attribute type 118a. Similarly, a corresponding ground-truth value of the attribute of the second attribute type 120a, such as the primary value 120a1, is one of the different values of the second attribute type 120a. These ground-truth values are used to train the multi-head neural network 112 in combination with the classification module 204. The multi-head neural network 112 processes each training audio signal sample 301, wherein the first output layer 112a extracts a first embedding vector, such as an embedding vector 302a1 for the ground truth value 118a1. The second output layer 112b extracts a second embedding vector, such as an embedding vector 302b1 for the ground truth value 120a. To that end, there may be many other different embedding vectors obtained from different training audio signal samples that will be associated with the same ground-truth value 118a1.

For example, for another training audio signal sample, 301n, another set of embedding vectors, such as an embedding vector 302an and an embedding vector 302bm may be extracted. The different embedding vectors extracted for different audio signal samples then form a first set of embedding vectors 302a, extracted by the first output layer 112a, and a second set of embedding vectors 302b, extracted by the second output layer 112b. In the illustration of FIG. 3A, only two training audio signal samples are shown for the brevity of the explanation. However, any equivalent number of training audio signal samples may be illustrated, without deviating from the scope of the present disclosure.

For example, the first embedding vector 302a1 and the second embedding vector 302b1 are then passed to the classification module 204, where a class label is assigned to the first embedding vector 302a1 and the second embedding vector 302b1. To that end, the first classifier 204a performs classification of the first embedding vector 302a1, and the second classifier 204b performs classification of the second embedding vector 302b1. The parameters of the multi-head neural network 112 and the classification module 204 are optimized jointly by minimizing a classification loss function based on the classification output of the first classifier 204a and the ground-truth value 118a1 of the attribute of the first attribute type 118a, and on the classification output of the second classifier 204b and the ground-truth value 120a of the attribute of the second attribute type. During training, the first set of embedding vectors 302a consisting of all the first embedding vectors obtained on each training audio signal 301, and the second set of embedding vectors 302b consisting of all the second embedding vectors obtained on each training audio signal 301, are stored in the anomalous sound detection system 102, such as in the memory 106 of the anomalous sound detection system 102, in association with the corresponding ground-truth values, such as the first value 118a1, the nth value 118an, the primary value 120a1, and the mth value 120am of the attributes associated with the training audio signals from which these embedding vectors were generated, as metadata.

After this optimization is performed during the first training stage, the parameters of the multi-head neural network 112 are fixed. The first set of embedding vectors 302a and the second set of embedding vectors 302b stored in the anomalous sound detection system 102 during the last epoch of training can be used for the testing phase, or they can be replaced by re-processing all training audio signals with the final multi-head neural network 112 with the fixed parameters obtained at the end of the training, in the same way as these sets of embedding vectors were obtained during training.

During the testing phase, the multi-head neural network 112 is configured to accept a testing audio signal and process it to obtain a first embedding vector and a second embedding vector. Anomaly detection is then performed by comparing the first embedding vector with embedding vectors from the first set of embedding vectors 302a, and the second embedding vector with embedding vectors from the second set of embedding vectors 302b. In some embodiments, the first embedding vector obtained from the testing audio signal is compared to all embedding vectors of the first set of embedding vectors 302a, and the second embedding vector obtained from the testing audio signal is compared to all embedding vectors of the second set of embedding vectors 302a.

Figure 3B:
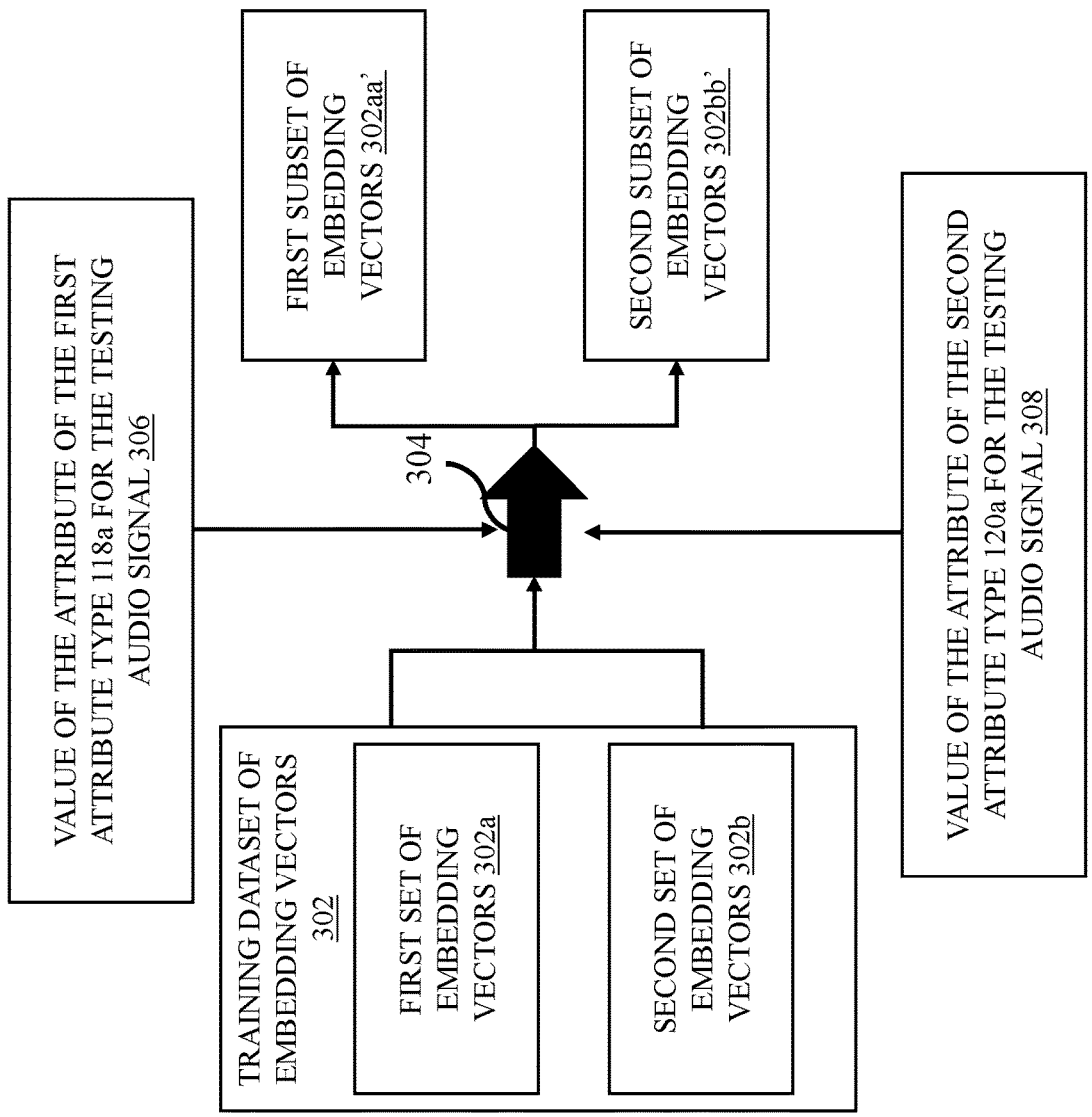
FIG. 3B illustrates a schematic diagram showing a testing phase operation of the anomalous sound detection system, according to an embodiment of the present disclosure.

FIG. 3B illustrates a schematic diagram showing a testing phase operation of the anomalous sound detection system, according to an embodiment of the present disclosure.

In an embodiment, the multi-head neural network 112 is configured to accept a value 306 of the attribute of the first attribute type 118a for a testing audio signal and select a first subset of embedding vectors 302aa' with matching first attribute from the first set of embedding vectors 302a, whose attribute value matches the accepted attribute value 306 for the testing audio signal.

In another embodiment, the multi-head neural network 112 is configured to accept a set of acceptable values of the attribute of the first attribute type 118a and place the embedding vector for a training signal in the first subset of embedding vectors 302aa' only if the value of the first attribute type for that training signal belongs to the set of acceptable values of the first attribute type 118a. For example, if the first attribute type 118a corresponds to an operating voltage of a motor, then the embedding vectors corresponding to only acceptable values of operating voltages of the motor, which are known to not cause any damage or harm to the motor, are placed in the first subset of embedding vectors 302aa'.

In an embodiment, the multi-head neural network 112 is configured to accept a value 308 of the attribute of the second attribute type 120a for the testing audio signal, and select a second subset of embedding vectors 302bb' with matching second attribute from the second set of embedding vectors 302a, whose attribute value matches the accepted attribute value 308 of the second attribute type 120a for the testing audio signal.

In another embodiment, the multi-head neural network 112 is configured to accept a set of acceptable values of the attribute of the second attribute type 120a, and place the embedding vector for a training signal in the second subset of embedding vectors 302bb' only if the value of the second attribute type for that training signal belongs to the set of acceptable values of the second attribute type 120a.

The anomalous sound detection system 102 is configured to store in the memory 106: the training dataset of embedding vectors 302 including the first set of embedding vectors 302a and the second set of embedding vectors 302b, and the associated values of the first and second attribute types for the training audio signals from which they were obtained. Hence, anomaly detection can be performed by comparing the first set of embedding vectors 302a, and the second set of embedding vectors 302b generated and stored at training time, or the first subset of embedding vectors 302aa' and the second subset of embedding vectors 302bb' extracted from them based on one of the criteria described above, to the first embedding vector 202a and the second embedding vector 202b respectively, that are produced at execution time, and may be different than the first set of embedding vectors 302a and the second set of embedding vectors 302b, that are previously produced by the multi-head neural network 112, and are classified previously. To that end, the reference to "previously" may be understood to be equivalent to "training time" for the scope of consideration in the present disclosure.

Further, during training phase, of the multi-head neural network 112, the training dataset of embedding vectors 302 is passed through a classification module, such as the classification module 204 shown in FIG. 2. The classification module 204 is a surrogate task classifier (typically implemented as a multinomial logistic regression aka softmax layer), for predicting a label for the received audio signal embeddings generated by the multi-head neural network 112. The prediction is based on surrogate tasks, such as, but not limited to, (1) predicting the exact model of the machine that produced the sound corresponding to the embedding (for example, there may be many different types of valve machines, all with a different model number), or (2) predicting an attribute of the machine based on its operating principle, e.g., at what speed is a fan running, or what is the voltage of the power source, (3) predicting background characteristics of where the normal sound was recorded, e.g., was it recorded in factory A, factory B, testing chamber, etc., or (4) creating synthetic anomalies by corrupting the sound signal or presenting an example from a different machine and then the predicted label for the surrogate task can be compared to the true label. Further, during training, the predicted label for the surrogate task can be compared to the true label using the cross entropy loss function.

Some embodiments are based on a recognition that while this comparison is advantageous for domain-dependent attributes because the value of the attribute during the execution of the anomalous detection system 102 is unknown, the value of the first attribute type 118a may be known during the execution, and comparing the first embedding vector 202a to embedding vectors in the first set of embedding vectors 302a corresponding to different values of the first attribute type 118a, is unnecessary, as only those normal first embedding vectors with the same value of the first attribute 118 of the first attribute type 118a are relevant in computing the overall anomaly score during execution. In some embodiments, the first embedding vector 202a is thus only compared to the first subset of embedding vectors 302aa' of embedding vectors corresponding to the same value of the first attribute type 118a.

At execution or inference time, the anomalous sound detection system 102 is configured to compare the first embedding vector 202a with the first set of embedding vectors 302a or the first subset of embedding vectors 302aa' previously produced by the multi-head neural network 112 at training phase, and stored in the memory 106, to classify attributes of the first attribute type 118a of the received audio signal 110 of inference time. The second embedding vector 202b is compared with the second set of embedding vectors 302b or the second subset of embedding vectors 302bb' previously produced by the multi-head neural network 112, to classify attributes of the second attribute type 120a of the received audio signal 110 of inference time. The results of the comparisons are used to determine a result of anomaly detection for the audio signal 110 received at the inference time.

In an embodiment, the comparison between the first embedding vector 202a with the first set of embedding vectors 302a or the first subset of embedding vectors 302aa' and the comparison between the second embedding vector 202b with the second set of embedding vectors 302b or the second subset of embedding vectors 302bb', is made using a nearest neighbor distance metric, wherein the nearest neighbor distance metric is one of Euclidean distance or cosine distance.

Further, the anomalous sound detection system 102 is configured to utilize the received audio signal 110 and the result of anomaly detection to determine an anomaly score for the received audio signal 110. The anomalous sound detection system 102 determines whether the received audio signal 110 is a normal audio signal or an anomalous audio signal, based on the anomaly score. The received audio signal 110 is determined to be anomalous when the anomaly score is above a pre-specified threshold value. In an example, both the anomaly score and the pre-specified threshold value may be numerical values between 0 and 1. For example, the pre-specified threshold value may be 0.5, and the determined anomaly score may be 0.4. As the anomaly score of 0.4 is lesser than the pre-specified threshold of 0.5, the received audio signal 110 is determined to be normal or non-anomalous in the present example. The pre-specified threshold is set based on experimental data in some embodiments.

Figure 4:
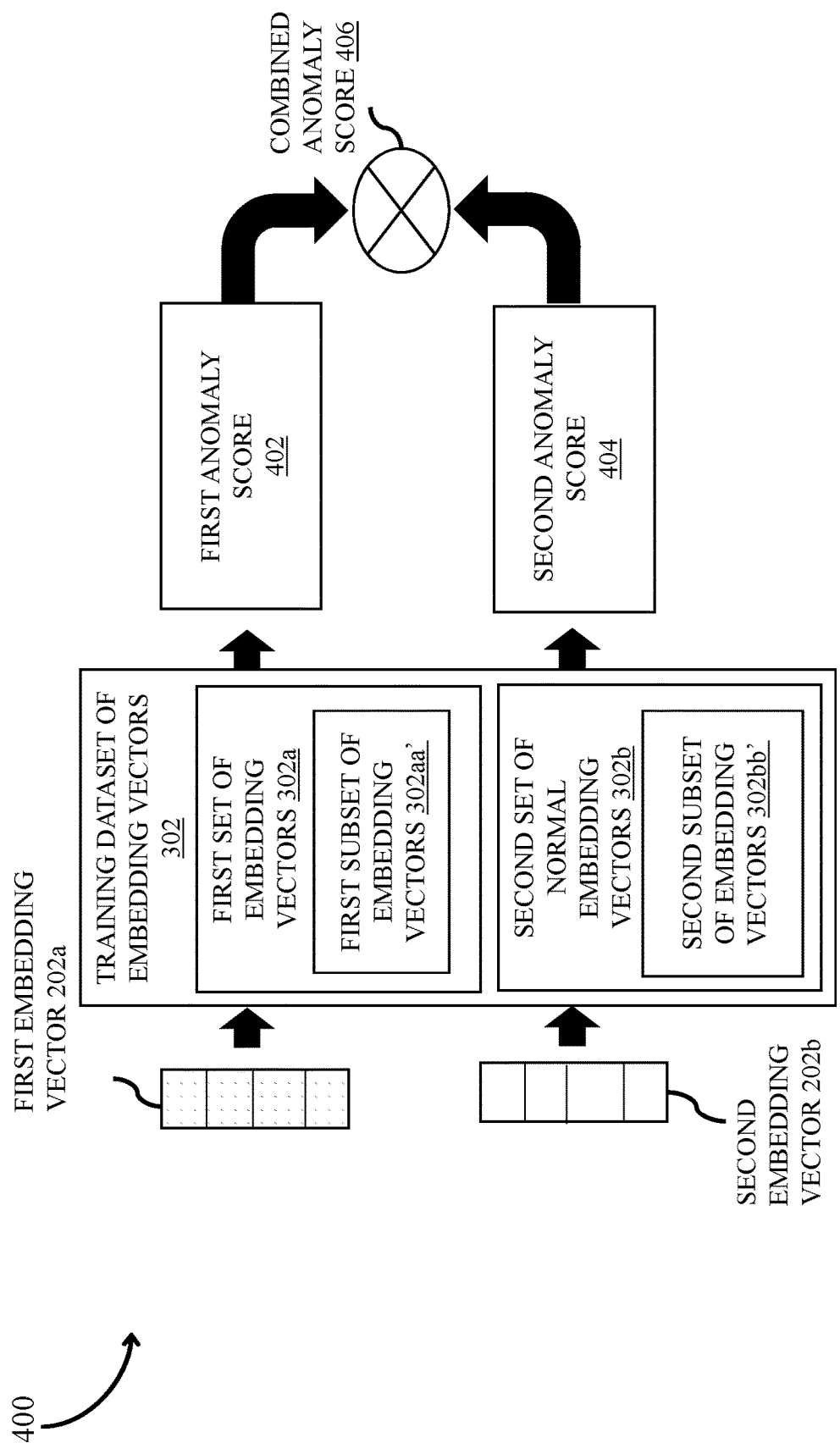
FIG. 4 illustrates a schematic diagram of the process of anomaly score determination, in accordance with an example embodiment of the present disclosure.

FIG. 4 illustrates a schematic diagram 400 of the process of anomaly score determination, in accordance with an example embodiment of the present disclosure. For the purpose of ease of explanation in the present disclosure, the training dataset of embedding vectors 302 shown in FIG. 4 includes—the first set of embedding vectors 302a, the first subset of embedding vectors 302aa', the second set of embedding vectors 302b, and the second subset of embedding vectors 302bb', which were explained in FIG. 3A and FIG. 3B above.

As shown in FIG. 4, the first embedding vector 202a produced at execution time is compared with the training dataset of embedding vectors, which include the first set of embedding vectors 302a, and the first subset of embedding vectors 302aa', previously produced by the multi-head neural network 112 (such as at training time) to produce a first anomaly score 402.

The second embedding vector 202b produced at execution time is compared with the training dataset of embedding vectors, which include the second set of embedding vectors 302b, and the second subset of embedding vectors 302bb' previously produced by the multi-head neural network 112 to produce a second anomaly score 404. The first anomaly score 402 and the second anomaly score 404 are then combined 406 to determine the result of anomaly detection 114 based on the combination 406 of the first anomaly score 402 and the second anomaly score 404.

In an example, the combination 406 of the first anomaly score 402 and the second anomaly score 404 is a weighted combination with a weight of the first anomaly score 402 less than a weight of the second anomaly score 404. To that end, a smaller weight on the first anomaly score 402 is used as the first attribute 118 may be less likely to cause a machine producing the audio signal 110 to fail compared to the second attribute 120. In an embodiment, different weights are considered for different anomaly scores, if over time some attributes have proven less dependable in predicting anomalies.

Figure 5A:
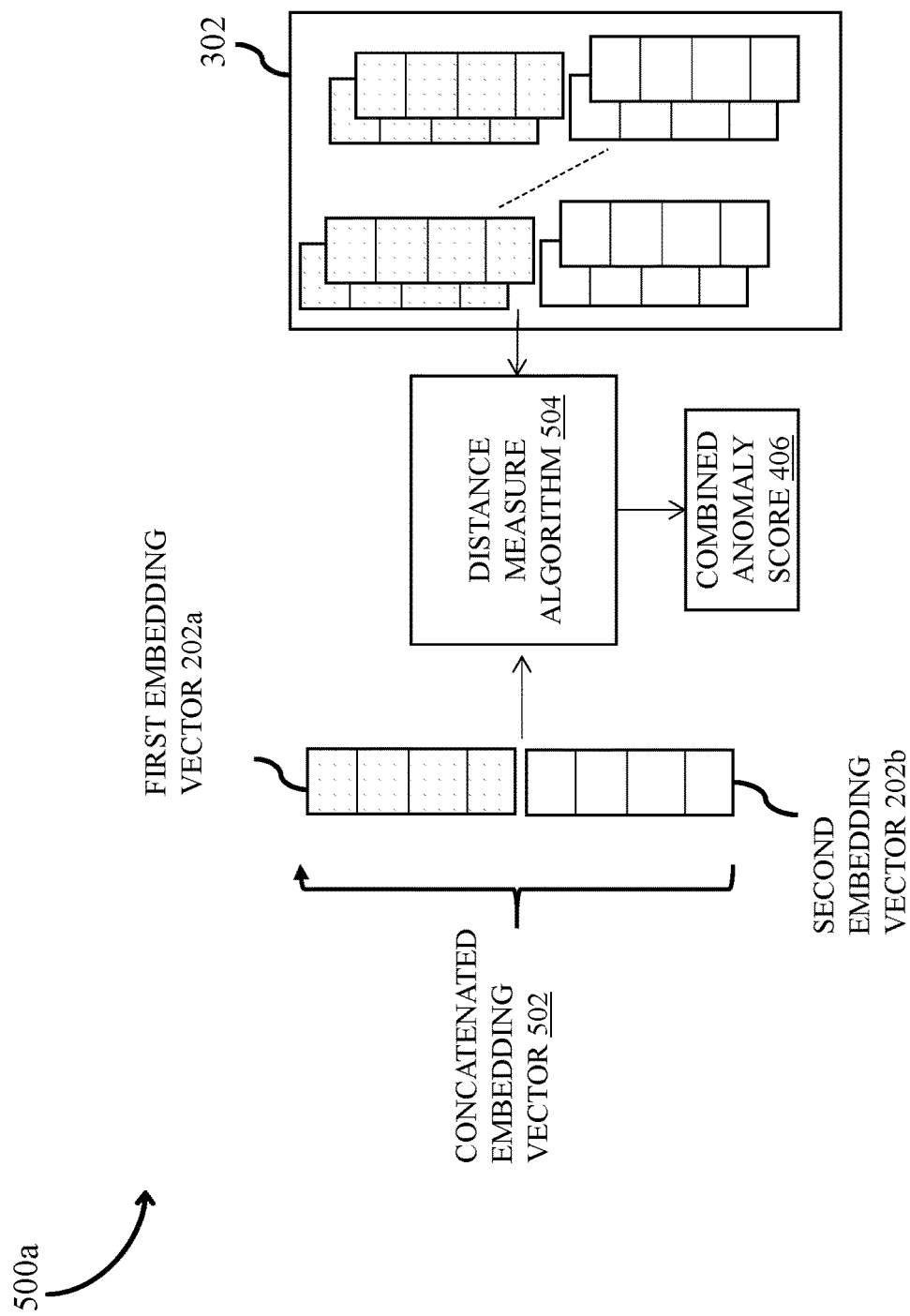
FIG. 5A illustrates a schematic showing an example method of anomaly score generation, in accordance with an example embodiment of the present disclosure.

FIG. 5A illustrates a schematic 500a showing an example method of anomaly score generation, in accordance with an example embodiment of the present disclosure.

The anomalous sound detection system 102 is configured to determine the anomaly score, such as the combined anomaly score 406, by concatenating the first embedding vector 202a and the second embedding vector 202b to generate a concatenated embedding vector 502. Further, a nearest neighbor distance algorithm 504 is used to compare the concatenated embedding vector 502 with the embedding vectors of the training dataset 302 by calculating minimum distance between the concatenated embedding vector 502 and the embedding vectors of the training dataset 302.

To that end, the anomalous sound detection system 102 is configured to compare the generated concatenated embedding vector 502 with each of the embedding vectors of the training dataset 302 using distance measure techniques for calculating the minimum distance between the concatenated embedding vector 502 and the embedding vectors of the training dataset 302. The distance measure techniques comprise at least one of a Euclidean distance technique, a cosine distance technique, or a weighted Euclidean distance. For example, the first embedding vector 202a is compared with the first set of embedding vectors 302a and the first subset of embedding vectors 302aa' to determine a first distance measure. Similarly, the second embedding vector 202b is compared with the second set of embedding vectors 302b and the second subset of embedding vectors 302bb' to determine a second distance measure. The first distance measure and the second distance measure are then combined by the distance measure algorithm 504 to generate the combined anomaly score 406. The combination may include such as a summation, an average, a weighted average, and the like.

Figure 5B:
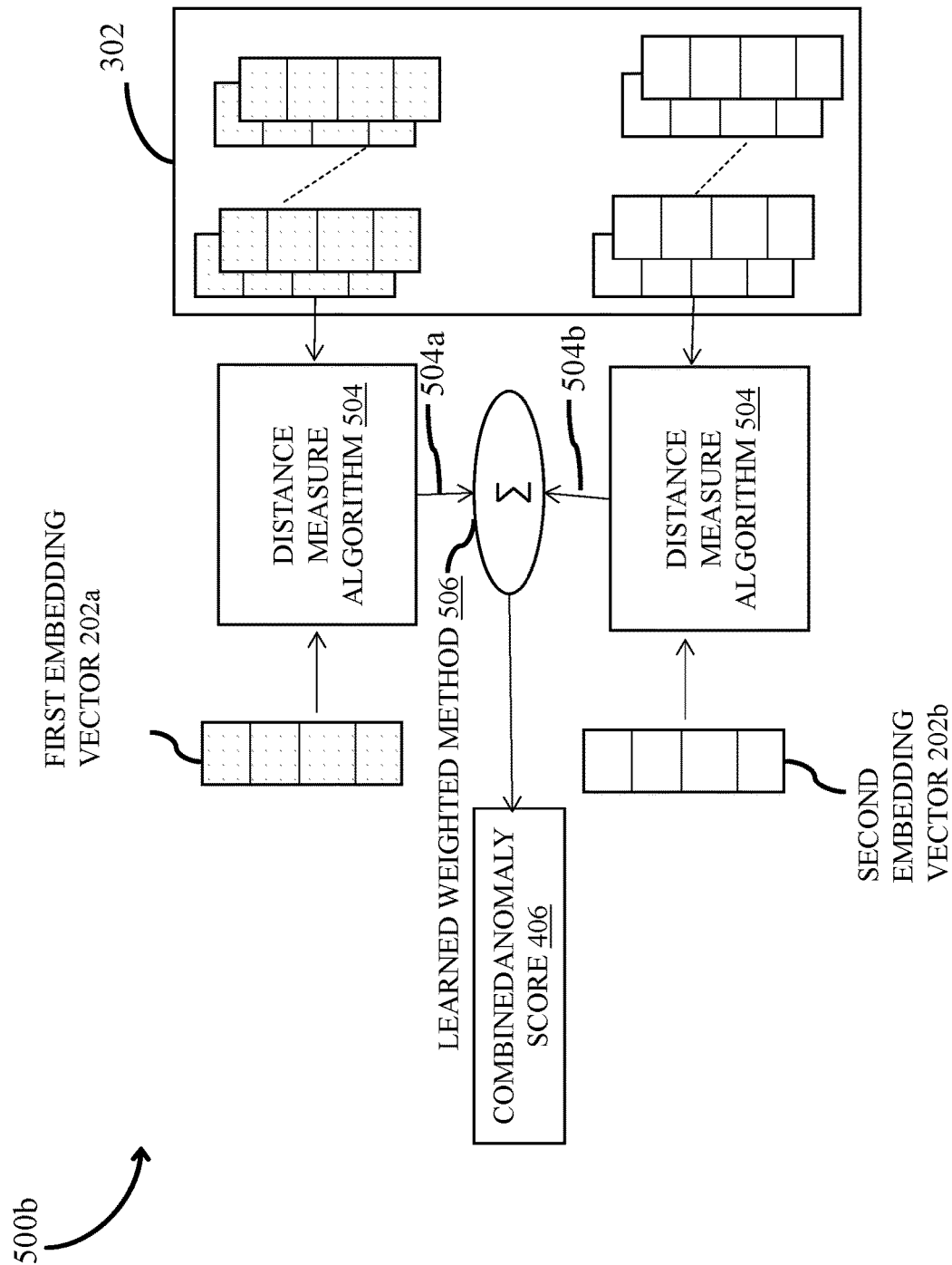
FIG. 5B illustrates a block diagram of another method to determine a combined anomaly score with the facilitation of a learned weighted method, in accordance with an embodiment of the present disclosure.

FIG. 5B illustrates a block diagram 500b of another method to determine the combined anomaly score 406 with facilitation of a learned weighted method, in accordance with an embodiment of the present disclosure. The anomalous sound detection system 102 is configured to determine the combined anomaly score 406 separately for the first embedding vector 202a and the second embedding vector 202b having disentangled dimensions by applying the distance measure algorithm 504 individually on the first embedding vector 202a and the second embedding vector 202b to determine a first anomaly score 504a and a second anomaly score 504b respectively. The disentanglement of dimensions corresponds to the first embedding vector 202a and the second embedding vector 202b having different dimensions, where a dimension refers to a quantitative or qualitative measure of features included in the dimension.

Further, the separate anomaly scores for the disentangled dimensions are combined using a learned weighted method 506 to determine the combined anomaly score 406. To that end, each of the first anomaly score 504a and the second anomaly score 504b is assigned a weight, before combining them with a known combination technique, such summation, averaging, and the like. The weight of the first anomaly score 504a which is generated for first set of attributes 118 (independent of the recording environment 100) is less than a weight of the second anomaly score 504b which is generated for second set of attributes 120 (dependent on the recording environment 100) in an example. This is because the value of the first set of attributes 118 may be known during the execution time and comparing the first embedding vector 202a to the first set of embedding vectors 302a and the first subset of embedding vectors 302aa' corresponding to different values of the attribute of the first type, is unnecessary or less relevant, as only those first subset of embedding vectors 302aa' with the same value of the attribute of the first type 118 are relevant in computing the overall anomaly score during execution. Such a weighted combination increases the accuracy and performance of the multi-head neural network 112 by putting less emphasis on redundant processing operations.

Furthermore, based on the contributions to the combined anomaly score 406 of a specific disentangled dimension, the anomalous sound detection system 102 generates the result of anomaly detection 114 to predict reason behind the anomalous sound. For example, if disentangled dimensions that corresponded to velocity prediction during execution contributed the most to the combined anomaly score 406 then the anomalous sound detection system 102 further causes the processor 104 to generate control commands to investigate only those parts of the machine that control the velocity as the likely cause of the detected anomalous sound.

In an example, at inference time, a database of prototype normal sound embeddings, in the form of the training dataset of normal embedding vectors, is used to compare the one or more embedding vectors 202 of the received audio signal 110 with the training dataset of normal embedding vectors. If the training dataset of normal embedding vectors is small enough, all training samples are used as prototypes. However, in some embodiments, the training dataset of normal embedding vectors is further reduced by using algorithms such as K-means clustering.

Figure 6:
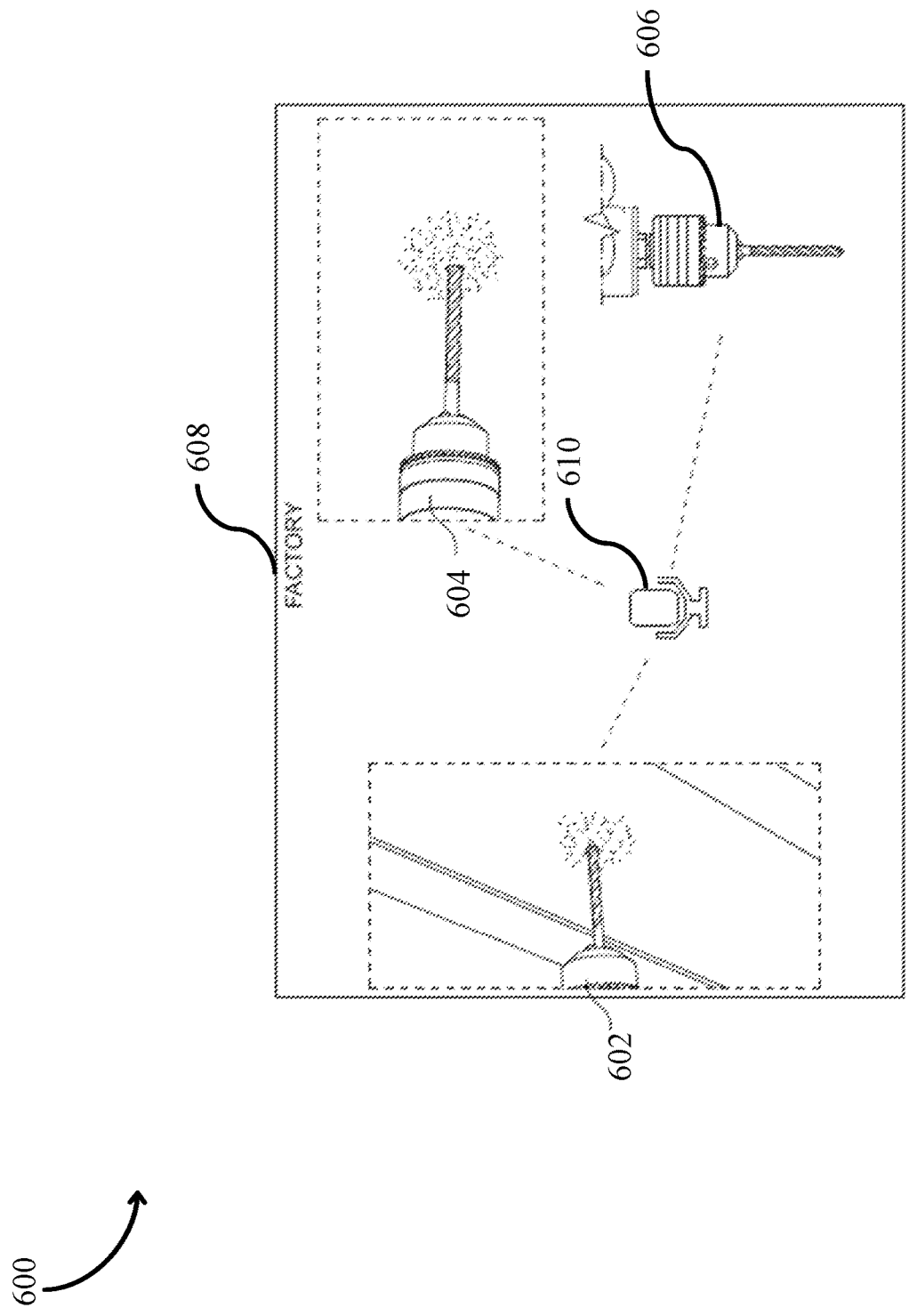
FIG. 6 illustrates a schematic diagram of a use case for the collection of the training dataset of embedding vectors used to train the multi-head neural network, in accordance with an embodiment of the present disclosure.

FIG. 6 illustrates a schematic diagram of a use case 600 for collection of the training dataset of embedding vectors 302 used to train the multi-head neural network 112, in accordance with an embodiment of the present disclosure. The anomalous sound detection system 102 utilizes the collected training dataset of embedding vectors 302 to detect an anomalous sound. The use case 600 shows different models of drilling machines: a drilling machine model 602, a drilling machine model 604, and a drilling machine model 606 in a factory 608 (hereinafter the different drilling machine models are referred to as drilling machines 602-606 for brevity of explanation). The drilling machines 602-606 are monitored with a microphone 610 to determine when an anomalous sound occurs. In an example, the drilling machine model 602 is used on a sheet of wood. The drilling machine model 604 is used on an iron sheet and the drilling machine model 606 is used on a sheet of steel. The training dataset of embedding vectors 302 is created using only sound recordings of the drilling machines 602-606 collected during normal operation. The drilling machines 602-606 are complicated machines and controlled by many different parameters of operation. Example parameters of operation could be the speed at which motor of the drilling machine rotates, the type of material that is being drilled, and the like. By varying the exemplar parameters of operation and recording the sounds they produce, the anomalous sound detection system 102 collects the training dataset of embedding vectors 302 (through the collection of corresponding audio signals and extracting embedding vectors out of them) that corresponds to normal training data. Further, a surrogate task is defined as a classifier whose goal is to predict a specific operating parameter from the sound signal produced by the drilling machines 602-606 (for example, predicting the speed of rotation). As the drilling machines 602-606 have multiple operating parameters hence, multiple different classifiers may be trained to classify the multiple operating parameters.

However, once the classifier is trained, the anomalous sound detection system 102 may not know a specific environment of an individual drilling machine at inference time. This specific environment can include things like the specific factory 608 (and associated background noises) where the drilling machines 602-606 are operating. These specific environments are referred as the domain. To make the anomalous sound detection system 102 work well in as many domains as possible, the different classifiers are trained to predict attributes that do not vary based on the domain—that is the domain-shared attributes features (for example, predicting the model number of the drilling machines 602-606, predicting how fast that the drill rotates, and the like), and to predict features that do vary based on the domain, herein referred to as domain-specific attributes (for example, predicting environment in which the drilling machine is operating in, or the type of material of the drilling machine).

By computing separate anomaly scores for each classifier at inference time, the anomalous sound detection system 102 can determine anomaly scores from embedding vectors that were trained by different classifiers (e.g. the first classifier 204a and the second classifier 204b) differently. For example, if any drilling machine is now used on plastic, and the anomalous sound detection system 102 never got any sound recording for the drilling machine drilled through plastic before, the anomalous sound detection system 102 may weigh the anomaly score from the domain-specific classifier. Alternatively, the anomalous sound detection system 102 can determine the weights between the different classifiers, based on how accurate classifiers are trained (i.e., accurate classifiers have higher weights). An additional approach for determining classifier weights of different dimensions could be after some known anomalies are observed, the anomalous sound detection system 102 may adjust the weights of the different dimensions such that the observed anomalies will be detected in the future with high confidence, without requiring any re-training of the classifiers.

Example Implementation

During training, a dataset D of N normal training examples for a given machine type is provided. The dataset $D=\{(X^{(n)}, y^{(n)})\}_{n=1}^{N}$, where $X \in \mathbb{R}^{F \times T}$ is a magnitude spectrogram with F frequencies and T time frames, and $y=[y_s, y_{a1}, \ldots, y_{aM}] \in \mathbb{N}^{M+1}$ is a vector of categorical surrogate task labels, where $y_s$ represents machine section (functionally equivalent to machine model number) and $y_{am}$ represents the categorical label of the m-th attribute among the M different attributes available for the given machine type. Further, a domain-shared (section) embedding $z_s$, that is the first embedding vector 202a, and a domain-specific (attribute) embedding $z_A$, that is the second embedding vector 202b, is obtained as:

$$z_S = L^{Sec}[CNN(X)] \in \mathbb{N}^{D_S}, z_A = L^{Att}[CNN(x)] \in \mathbb{N}^{D_A} \quad (1)$$

Where CNN(.) is a shared convolutional neural network, such as the multi-head neural network 112, while $L^{Sec}$ and $L^{Att}$ represent section and attribute specific linear embedding layers, respectively (implemented as 1×1 convolutions). All parameters are trained by minimizing $L = L^{Sec} + L^{Att}$, where $$L^{Sec} = \log \frac{\exp(w_{0,y_s} \cdot z_S + b_{0,y_s})}{\sum_{c=1}^{C} \exp(w_{0,c} \cdot z_S + b_{0,C})} \quad (2)$$

$$L^{Att} = \sum_{m=1}^{M} \log \frac{\exp(w_{m,y_m} \cdot z_A + b_{m,y_m})}{\sum_{c_m=1}^{c_m} \exp(w_{m,c_m} \cdot z_A + b_{m,c_m})} \quad (3)$$

are the cross-entropy losses for section and attributes, respectively, wi,j and bi,j are learned weight vectors and biases of the associated classifiers, c indexes the C=6 sections and cm indexes the Cm values of the m-th attribute. Because not all attributes are present among all audio examples of a given machine type in the dataset, the attribute loss in $L^{Att}$ (3) is combined over all attributes in a multi-task learning fashion from the same embedding $z_A$, rather than learning disentangled feature dimensions for each attribute. If an attribute is unknown for an audio example, the corresponding term in the sum of (3) is ignored.

During inference, the nearest neighbor (NN) distance between a test embedding $z_q$ and all corresponding training set embeddings $z_q^{(j)}$ for computing an anomaly score, i.e., $$D_{NN}(z_q, D) = \min_{j \in D} D_{cos}(z_q, z_q^{(j)}), \quad (4)$$

where $D_{cos}(.,.)$ is the cosine distance between two embedding vectors. The disentangled model allows to explore multiple inference approaches depending on which embedding dimensions are used for $z_q$ in (4) as discussed below.

For disentangled concatenation, concatenated embedding is used, $z_c = [z_S^T, z_A^T]^T$ in (4).

For disentangled weighted, a weighted average of NN distances separately computed for section embedding $z_S$ and attribute embedding $z_A$, i.e., $$D_{NN}^{wt}(z_S, z_A, D) = w_s D_{NN}(z_s, D) + w_A D_{NN}(z_A, D), \quad (5)$$

Where $w_s$ and $w_A$ are scalar weights, which are optimized after training is complete.

For disentangled sections, only section embedding $z_S$ is used in (4).

For disentangled attributes, only attribute embedding $z_A$ is used in (4).

At test time, the section label of the test sample is known, therefore, limit to the training set samples is set from D when computing the NN distance to be only those samples belonging to the appropriate section.

Figure 7:
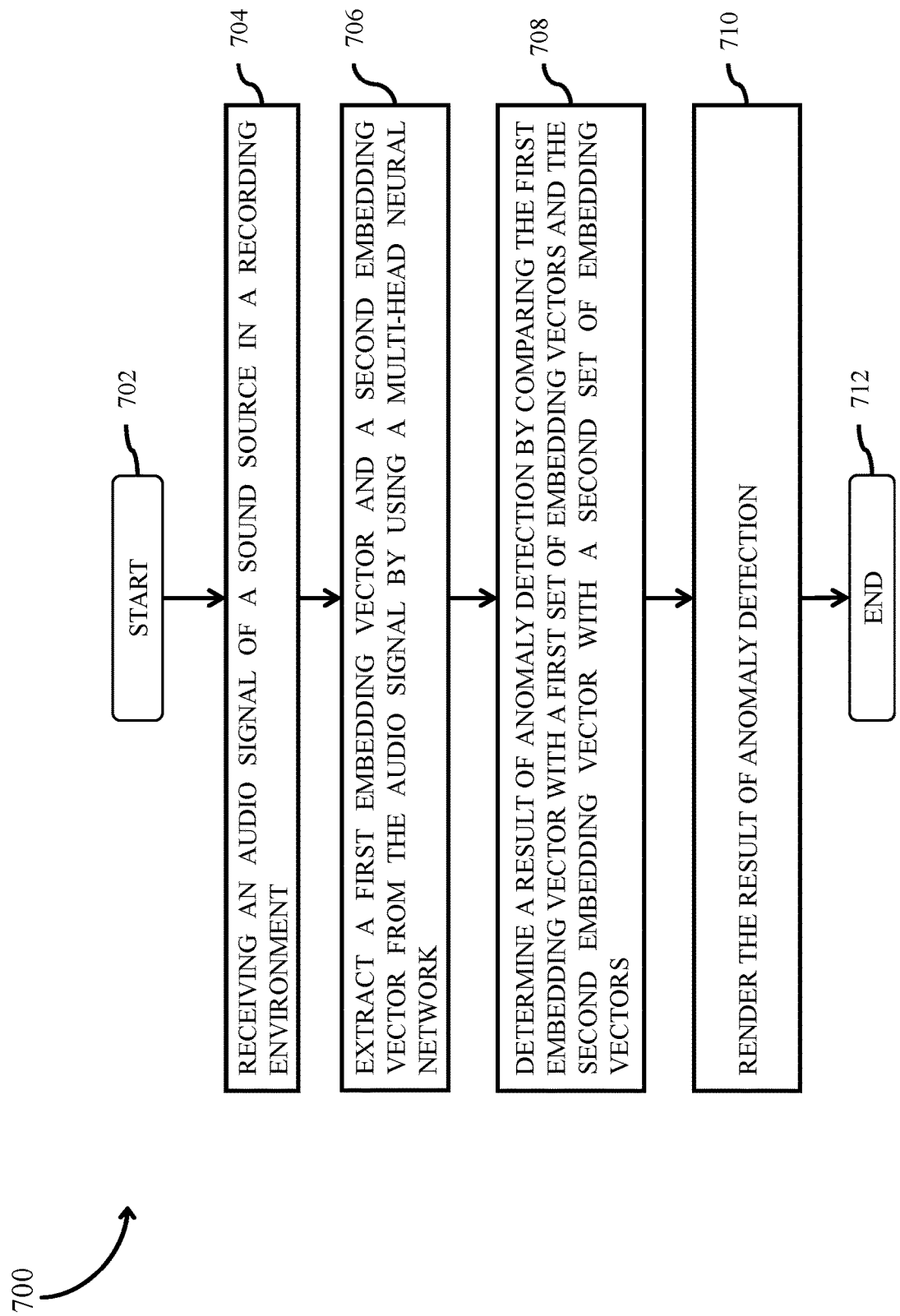
FIG. 7 illustrates a flow chart depicting a method for detection of the anomalous sound signal, in accordance with an embodiment of the present disclosure.

The example implementation is further explained using the flowchart described in FIG. 7.

FIG. 7 illustrates a flow chart 700 depicting a method for detection of the anomalous sound signal, in accordance with an embodiment of the present disclosure. The method is performed by the anomalous sound detection system 102. The method initiates at operation 702.

At 704, the method includes receiving an audio signal (e.g., the audio signal 110 of FIG. 1) from the sound source 108 in the recording environment 100. The sound source 108 corresponds to at least one of a machine, an electric equipment, or an engine. In an example, the sound source 108 may include a drilling machine, a grinding machine, a packaging machine, and the like. Further, the anomalous sound detection system 102 is configured to utilize the received audio signal 110 to generate one or more embedding vectors with facilitation of a multi-head neural network, such as the multi-head neural network 112. The sound source 108 and the recording environment 100 are characterized by the set of attributes 116 including the first attribute 118 pertaining to the first attribute type 118a and the second attribute 120 pertaining to the second attribute type 120a. The first attribute 118 is independent of the recording environment 100, while the second attribute is dependent on the recording environment 100. For example, in case of a motor operating in an industrial automation environment, the attributes pertaining to the type of motor are of the first attribute type 118a, that is independent of the recording environment 100 of the industrial automation set-up, while the attributes pertaining to the states of operation of the motor, like operating voltages, operating torque etc., are dependent on the type of industrial automation set-up. Therefore, these attributes pertaining to the states of operation of the motor are of the second attribute type 120a. The received audio signal 110 is thus formed as a combination of one or more of the first attribute 118 of the first attribute type 118a and the second attribute 120 of the second attribute type 120a.

At 706, the received audio signal 110 is processed with a multi-head neural network, such as the multi-head neural network 112 described previously, that is trained to extract from the received audio signal 110 a first embedding vector indicative of the first attribute type 118a and a second embedding vector indicative of the second attribute type 120a. As shown in FIG. 2, the multi-head neural network 112 passes the received audio signal 110 through the first output layer 112a to extract the first embedding vector 202a of the first attribute type 118a, and through the second output layer 112b to extract the second embedding vector 202b of the second attribute type 120a.

At 708, the first embedding vector is compared with a first set of embedding vectors previously produced by the multi-head neural network to classify attributes of the first attribute type and the second embedding vector is compared with a second set of embedding vectors previously produced by the multi-head neural network to classify attributes of the second attribute type to determine a result of anomaly detection. As described previously in conjunction with FIG. 4, the first embedding vector 202a is compared with the first set of embedding vectors 302a, which also includes the first subset of embedding vectors 302aa' of the training dataset of embedding vectors 302 previously produced by the multi-head neural network 112 at training time and stored in the memory 106 of the anomalous sound detection system 102. Similarly, the second embedding vector 202b is compared with the second set of embedding vectors 302b, which also includes the second subset of embedding vectors 302bb' of the training dataset of embedding vectors 302 previously produced by the multi-head neural network 112 at training time and stored in the memory 106 of the anomalous sound detection system 102. The comparisons lead to generation of the first anomaly score 402 and the second anomaly score 404 which are combined to generate the combined anomaly score 406. The combination is done using any of the techniques described previously in conjunction with FIG. 5A and FIG. 5B, that is using a concatenated combination of embedding vectors or using a learned weighted method on anomaly scores, or any other equivalent technique. The generated combined anomaly score 406 is then used to determine the result of anomaly detection 114. For example, the result of anomaly detection 114 is detection of an anomalous sound when the determined combined anomaly score is above a pre-specified threshold value. In an example, the pre-specified threshold value may be set by a machine learning module of the processor 104, for example by using the $95^{th}$ percentile of the anomaly scores computed across the entire non-anomalous training set.

At 710, the result of anomaly detection 114 is rendered. The rendering may be done such as on one or more of: a display, a user interface, an audio interface, or a combination thereof associated with the anomalous sound detection system 102. For example, the anomalous sound detection system 102 displays an anomalous sound signal on a display interface showing a spectrogram of different audio signals received in the recording environment 100. The spectrogram of the anomalous sound signal may be highlighted in a different color from the spectrogram of non-anomalous sound signals. For example, the spectrogram of the anomalous sound signal may be highlighted red, while the spectrogram of non-anomalous sound signals may be displayed in green color. Also, the display may further include more information about the source of the anomalous sound signal, which may be obtained from the first embedding vector 202a or the second embedding vector 202b generated for the received audio signal 110. The method terminates at 712.

The method illustrated in FIG. 7 provides more accurate and efficient detection of anomalous sound signals, which can be used in variety of applications, such as for machines, engines, numerical controlled components, and the like.

Figure 8:
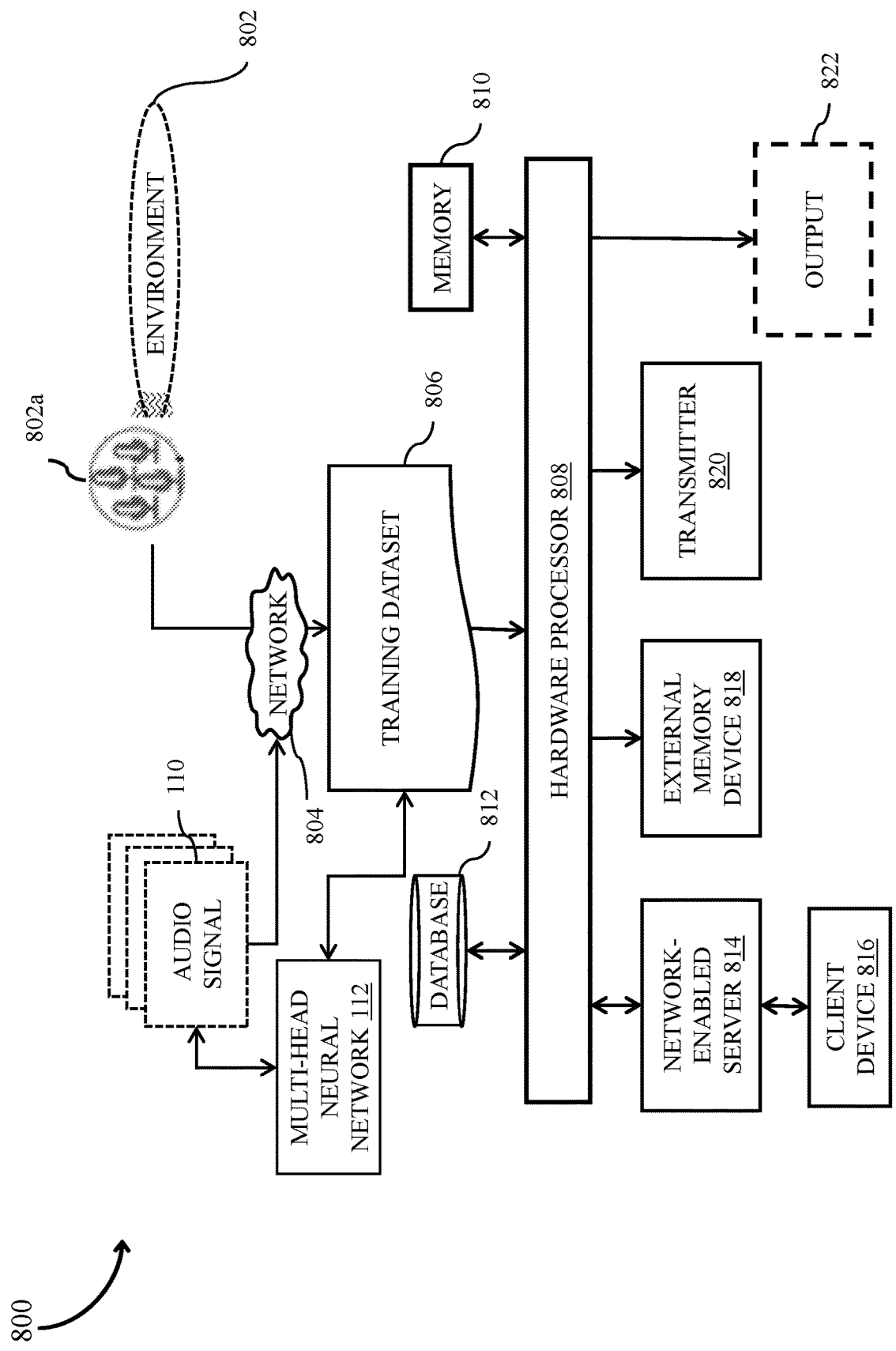
FIG. 8 illustrates a block diagram of a hardware framework of the anomalous sound detection system, in accordance with an embodiment of the present disclosure.

FIG. 8 illustrates a block diagram 800 of a hardware framework of the anomalous sound detection system 102, in accordance with an embodiment of the present disclosure. In some example embodiments, the block diagram 800 includes one or more microphones 802a that collect the audio signal 110 and a training dataset 806 (which is equivalent to the training dataset 302 shown in FIG. 3).

The anomalous sound detection system 102 includes a hardware processor 808. The hardware processor 808 is in communication with a computer storage memory, such as a memory 810. The memory 810 includes stored data, including algorithms, instructions and other data that is implemented by the hardware processor 808. It is contemplated that the hardware processor 808 includes two or more hardware processors depending upon the requirements of the specific application. The two or more hardware processors are either internal or external. The anomalous sound detection system 102 is incorporated with other components including output interfaces and transceivers, among other devices.

In some alternative embodiments, the hardware processor 808 is connected to the network 804, which is in communication with the audio signal 110 sources. The network 804 includes but is not limited to, by non-limiting example, one or more local area networks (LANs) and/or wide area networks (WANs). The network 804 also includes enterprise-wide computer networks, intranets, and the Internet. The anomalous sound detection system 102 includes one or more number of client devices, storage components, and data sources. Each of the one or more number of client devices, storage components, and data sources comprise a device or multiple devices cooperating in a distributed environment of the network 804.

In some other alternative embodiments, the hardware processor 808 is connected to a network-enabled server 814 connected to a client device 816. The network-enabled server 814 corresponds to a dedicated computer connected to a network that run software intended to process client requests received from the client device 816 and provide appropriate responses on the client device 816. The hardware processor 808 is connected to an external memory device 818 that stores all necessary data used in detection of the anomalous sound signal, and a transmitter 820. The transmitter 820 helps in transmission of data between the network-enabled server 814 and the client device 816. Further, an output 822 associated with the detection of the anomalous sound signal is generated.

The audio signal 110 and the training dataset 806 are further processed by the multi-head neural network 112. The multi-head neural network 112 is trained with the training dataset 806 of normal embedding vector. (as explained previously).

The anomalous sound detection system 102 is configured to detect a faulty operating part in a manufacturing set-up based on anomalous sound detection disclosed in various embodiments described herein.

Many modifications and other embodiments of the disclosure set forth herein will come to mind to one skilled in the art to which these disclosures pertain having the benefit of the teachings presented in the foregoing descriptions and the associated drawings. It is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. An anomalous sound detection system comprising:
at least one processor; and
memory having instructions stored thereon that, when executed by the at least one processor, cause the anomalous sound detection system to:
receive an audio signal generated by a sound source in a recording environment, wherein the sound source and the recording environment are characterized by a set of attributes including a first attribute pertaining to a first attribute type and a second attribute pertaining to a second attribute type;
process the received audio signal with a multi-head neural network trained to extract from the received audio signal a first embedding vector indicative of the first attribute type and a second embedding vector indicative of the second attribute type;
compare the first embedding vector with a first set of embedding vectors previously produced by the multi-head neural network to classify attributes of the first attribute type and compare the second embedding vector with a second set of embedding vectors previously produced by the multi-head neural network to classify attributes of the second attribute type to determine a result of anomaly detection; and
render the result of anomaly detection.

2. The anomalous sound detection system of claim 1, wherein the multi-head neural network includes a convolutional neural network module connected to multiple thin output layers including a first output layer for outputting the attributes of the first attribute type and a second output layer for outputting the attributes of the second attribute type.

3. The anomalous sound detection system of claim 1, wherein:
the first attribute type comprises attributes such that a classification of the attributes of the first attribute type is independent of one or a combination of: the recording environment, a type of the sound source, and a state of operation of the sound source, and
the second attribute type comprises other attributes such that a classification of the other attributes of the second attribute type is dependent on one or a combination of the recording environment, the type of the sound source, and the state of operation of the sound source.

4. The anomalous sound detection system of claim 3, wherein the sound source is a machine generating the audio signal during an operation, wherein the first embedding vector is indicative of a type of the machine, and wherein the second embedding vector is indicative of a state of the operation of the machine.

5. The anomalous sound detection system of claim 4, wherein the machine includes a motor, and the type of the machine includes a type of the motor, wherein the state of the operation includes one or a combination of a characteristic of an input to the motor and a characteristic of an output of the motor.

6. The anomalous sound detection system of claim 4, wherein the machine is one or a combination of a drone, a robot, a numerically controlled machine, and an engine.

7. The anomalous sound detection system of claim 1, wherein the classification of the attributes of the first attribute type is governed by a first classifier used for training the multi-head neural network to produce the first set of embedding vectors.

8. The anomalous sound detection system of claim 1, wherein the classification of the attributes of the second attribute type is governed by a second classifier used for training the multi-head neural network to produce the second set of embedding vectors.

9. The anomalous sound detection system of claim 1, wherein the multi-head neural network is trained with training data including audio signals pertaining to different values of the attributes of the first attribute type and different values of the attributes of the second attribute type, wherein, during the processing of the received audio signal with the multi-head neural network, a value of the attribute of the first type of the received audio signal is known, and wherein the first set of embedding vectors includes a first subset of embedding vectors indicative of the known value of the attribute of the first type.

10. The anomalous sound detection system of claim 1, wherein the multi-head neural network is trained with training data including audio signals pertaining to different values of the attributes of the first attribute type and different values of the attributes of the second attribute type, wherein, during the processing of the received audio signal with the multi-head neural network, the processor is configured to
 accept a value of the attribute of the first type of the received audio signal; and
 place in the first set of embedding vectors only a first subset of embedding vectors indicative of the accepted value of the attribute of the first type.

11. The anomalous sound detection system of claim 1, wherein the comparison between the first embedding vector with the first set of embedding vectors previously produced by the multi-head neural network and the comparison between the second embedding vector with the second set of embedding vectors previously produced by the multi-head neural network, is made using a nearest neighbor distance metric, wherein the nearest neighbor distance metric is one of Euclidean distance or cosine distance or weighted Euclidean distance.

12. The anomalous sound detection system of claim 1, wherein the at least one processor causes the anomalous sound detection system to:
 determine the result of anomaly detection based on a combined anomaly score to detect an anomalous sound signal, wherein the anomalous sound signal is detected when the combined anomaly score is above a prespecified threshold value.

13. The anomalous sound detection system of claim 1, wherein to determine the result of anomaly detection the processor is configured to compare the first embedding vector with the first set of embedding vectors to produce a first anomaly score;
 compare the second embedding vector with the second set of embedding vectors to produce a second anomaly score; and
 determine the result of anomaly detection based on a combination of the first anomaly score and the second anomaly score, the combination of the first anomaly score and the second anomaly score producing a combined anomaly score.

14. The method of claim 13, wherein the combination of the first anomaly score and the second anomaly score is a weighted combination with a weight of the first anomaly score less than a weight of the second anomaly score.

15. The anomalous sound detection system of claim 1, wherein to determine the result of anomaly detection the processor is configured to
 combine the first embedding vector and the second embedding vector to obtain a combined embedding vector;
 compare the combined embedding vector with a set of normal combined embedding vectors previously obtained by combining first embedding vectors and second embedding vectors produced by the multi-head neural network on normal audio signals to produce a combined anomaly score; and
 determine the result of anomaly detection based on the combined anomaly score.

16. The anomalous sound detection system of claim 15, wherein to combine the first embedding vector and the second embedding vector to obtain the combined embedding vector, the processor is configured to concatenate the first embedding vector and the second embedding vector.

17. The anomalous sound detection system of claim 1, wherein the rendered result of anomaly detection is used to predict a fault associated with at least one of the sound source and the recording environment.

18. A computer-implemented method for performing detection of anomalous sound, the computer-implemented method comprising:
 receiving an audio signal generated by a sound source in a recording environment, wherein the sound source and the recording environment are characterized by a set of attributes including a first attribute pertaining to a first attribute type and a second attribute pertaining to a second attribute type;
 processing the received audio signal with a multi-head neural network trained to extract from the received audio signal a first embedding vector indicative of the first attribute type and a second embedding vector indicative of the second attribute type;
 comparing the first embedding vector with a first set of embedding vectors previously produced by the multi-head neural network to classify attributes of the first attribute type and comparing the second embedding vector with a second set of embedding vectors previously produced by the multi-head neural network to classify attributes of the second attribute type to determine a result of anomaly detection; and
 rendering the result of anomaly detection.

19. The computer-implemented method of claim 18, wherein the multi-head neural network includes a convolutional neural network module connected to multiple thin output layers including a first output layer for outputting the attributes of the first attribute type and a second output layer for outputting the attributes of the second attribute type.

20. The computer-implemented method of claim 18, wherein wherein:
 the first attribute type comprises attributes such that a classification of the attributes of the first attribute type is independent of one or a combination of: the recording environment, a type of the sound source, and a state of operation of the sound source, and
 the second attribute type comprises other attributes such that a classification of the other attributes of the second attribute type is dependent on one or a combination of the recording environment, the type of the sound source, and the state of operation of the sound source.

* * * * *